United States Patent
Cho et al.

(10) Patent No.: US 8,611,197 B2
(45) Date of Patent: Dec. 17, 2013

(54) OPTICAL RECORDING DEVICE AND METHOD

(75) Inventors: Won-ik Cho, Seoul (KR); Nag-eui Choi, Suwon-si (KR); Seung-ki Kim, Suwon-si (KR); Ho-jin Kang, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/610,033

(22) Filed: Sep. 11, 2012

(65) Prior Publication Data

US 2013/0088947 A1    Apr. 11, 2013

(30) Foreign Application Priority Data

Oct. 6, 2011    (KR) .................. 10-2011-0101831

(51) Int. Cl.
   *G11B 7/00*    (2006.01)
(52) U.S. Cl.
   USPC .................... 369/47.53; 369/47.5; 369/47.52; 369/53.26
(58) Field of Classification Search
   None
   See application file for complete search history.

(56) References Cited

U.S. PATENT DOCUMENTS

| | | | | |
|---|---|---|---|---|
| 8,259,548 | B2 * | 9/2012 | Minamiguchi et al. | 369/53.22 |
| 2004/0184378 | A1 * | 9/2004 | Kwon et al. | 369/53.26 |
| 2006/0256679 | A1 * | 11/2006 | Chang et al. | 369/47.5 |
| 2007/0058508 | A1 * | 3/2007 | Kim et al. | 369/47.53 |
| 2008/0186820 | A1 * | 8/2008 | Weng et al. | 369/47.53 |
| 2008/0192594 | A1 * | 8/2008 | Liu | 369/47.5 |
| 2008/0310268 | A1 * | 12/2008 | Chuang | 369/47.52 |
| 2009/0180375 | A1 * | 7/2009 | Miyashita et al. | 369/283 |
| 2010/0202273 | A1 * | 8/2010 | Kurihara et al. | 369/124.01 |
| 2012/0051198 | A1 * | 3/2012 | Shigematsu et al. | 369/47.15 |

FOREIGN PATENT DOCUMENTS

JP    2007-080404 A    3/2007

* cited by examiner

*Primary Examiner* — Van Chow
(74) *Attorney, Agent, or Firm* — NSIP Law

(57) ABSTRACT

Provided is an optical write device and method. The optical recording method includes generating a first signal including a preset write pulse power Pm in response to information to be written, generating a second signal including an over drive pulse power Po that is synchronized with the preset write pulse power Pm and which is at a higher level than the preset write pulse power Pm, and writing the information to an optical disc using a driving signal that is obtained by synthesizing the first and second signals.

20 Claims, 5 Drawing Sheets

$\beta = 0$
(a)

$\beta > 0$ (High power)
(b)

OPTICAL RECORDING DEVICE AND METHOD

CROSS-REFERENCE TO RELATED APPLICATION(S)

This application claims the benefit under 35 USC §119(a) of Korean Patent Application No. 10-2011-0101831, filed on Oct. 6, 2011, in the Korean Intellectual Property Office, the entire disclosure of which is incorporated herein by reference for all purposes.

BACKGROUND

1. Field

The following description relates to an optical recording method and an optical recording device, and more particularly, to a strategy for writing information to an optical disc.

2. Description of Related Art

Optical disc drives (ODDs) may be specialized to reduce a recording time and to have good reproduction characteristics. In order to store information written to an optical disc for a long duration of time while not deteriorating the optical disc, a good-quality optical disc is required, and write characteristics of an optical disc drive that writes data to the optical disc should be excellent.

General optical discs have a large difference in write quality due to their storage life spans. One of the reasons for the large difference in quality is that an optical disc is rotated while vibrating in a vertical direction. As a result, uniform optical power may not reach a write layer.

To cope with the vibration, an actuator typically follows disc vibration using a focus servo system. Even with the focus servo system, a difference in write quality occurs in optical discs because thicknesses of reflective layers of optical discs are not uniform. For example, reflective layers of optical discs may be formed by a physical deposition method, such as sputtering. As a result, thicknesses of inner regions, intermediate regions, and outer regions thereof may not be uniform.

Generally, a thickness of a reflective layer of an intermediate region of an optical disc is larger than a thickness of a reflective layer in inner and outer regions of the optical disc. As a result, if information is written onto an optical disc from the inner region to the outer region using the same optical power, excessive optical power is set in the inner and outer regions of the optical disc.

To cope with the varying thickness, an optical power calibration (OPC) operation of an ODD is performed before information is written onto the optical disc. However, in the OPC operation, optical output is optimized in the intermediate region of the optical disc, which results in lowering the long-term storability of information written in the inner and outer regions of the optical disc because of excessive optical output by the inner and outer regions of the optical disc.

SUMMARY

In an aspect, there is provided an optical recording method including generating a first signal comprising a preset write pulse power Pm, in response to information to be written, generating a second signal comprising an over drive pulse power Po that is synchronized with the preset write pulse power Pm, and writing the information on an optical disc using a driving signal that is obtained by synthesizing the first and second signals, wherein the preset write pulse power Pm and the over drive pulse power Po satisfy the following equation: $1.1 \leq (Pm+Po)/Pm \leq 1.5$.

An optical write index β may be defined by a positive pulse level A1 and a negative pulse level A2 of the preset write pulse power Pm, according to the following equation: $\beta = A1 - A2/(A1+A2)$, where β is set to be less than 7%.

Information may be written to the optical disc at a constant linear velocity (CLV).

Information may be written to the optical disc at a zone constant linear velocity (Z-CLV).

The preset write pulse power Pm and the over drive pulse power Po may satisfy the following equations in which $(Pm+Po)/Pm=1.3$, and $\beta=3$.

The over drive pulse power Po may be at a higher level than the preset write pulse power Pm.

In an aspect, there is provided an optical disc drive including an optical pickup configured to write information to an optical disc, and a driving circuit configured to generate a driving signal for writing the information to the optical disc, wherein the driving circuit generates a first signal comprising a preset write pulse power Pm, in response to the information to be written, generates a second signal comprising an over drive pulse power Po that is synchronized with the preset write pulse power Pm, and outputs a high frequency driving signal that is obtained by synthesizing the first and second signals to the optical pickup, and the preset write pulse power Pm and the over drive pulse power Po satisfy the following equation: $1.1 \leq (Pm+Po)/Pm \leq 1.5$.

An optical write index β may be defined by a positive pulse level A1 and a negative pulse level A2 of the preset write pulse power Pm, according to the following equation: $\beta = A1 - A2/(A1+A2)$, where β is set to be less than 7%.

Information may be written to the optical disc at a constant linear velocity (CLV).

Information may be written to the optical disc at a zone constant linear velocity (Z-CLV).

The preset write pulse power Pm and the over drive pulse power Po may satisfy the following equations in which $(Pm+Po)/Pm=1.3$, and $\beta=3$.

The over drive pulse power Po may be at a higher level than the preset write pulse power Pm.

Other features and aspects may be apparent from the following detailed description, the drawings, and the claims.

Figure 1:
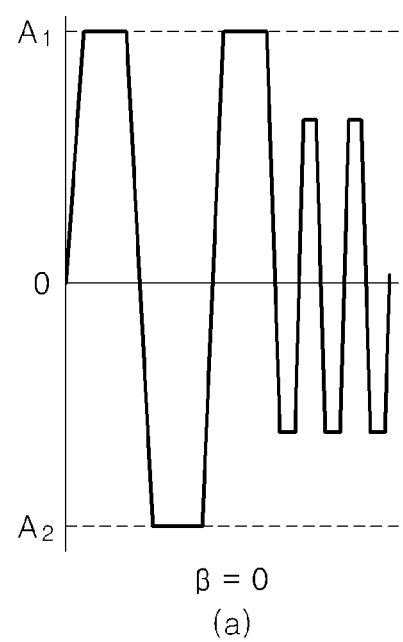
FIG. 1 is a diagram illustrating examples of pulse waveforms of write power when information is written to an optical disc.
Figure 1:
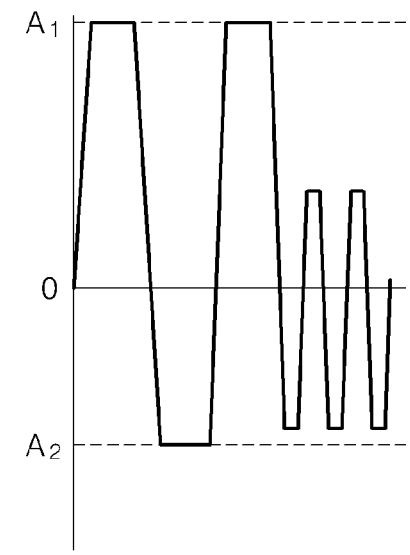

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

An optical disc used in an optical recording method according to various examples herein may be a compact disc (CD), a digital versatile disc (DVD), a high definition-digital versatile disc (HD-DVD), a Blu-ray disc (BD), a holographic versatile disc (HVD), and the like.

Various aspects describe an optimum recording method whereby information written to an optical disc may be stored for a greater length of time while not deteriorating the optical disc and write quality and reproduction characteristics of the optical disc may be improved by using high optical power.

FIG. 1 illustrates examples of pulse waveforms of write power when information is written onto an optical disc.

Referring to FIG. 1, β refers to an optical write index that is based on writing data to an optical disc. In general, β is defined as the following Equation 1:

$$\beta = (|A1| - |A2|)/(|A1| + |A2|) \quad (1),$$

where A1 is a positive value of write power, and A2 is a negative value of the write power, as shown in (a) and (b) of FIG. 1. FIG. 1 (a) illustrates an example in which absolute values of A1 and A2 are the same. FIG. 1 (b) illustrates an example in which an absolute value of A1 is greater than an absolute value of A2. The example of FIG. 1 (b) may be used in writing high output information.

According to various aspects, a long-term storability of written information may be improved in a condition of high optical power along with β having a value of zero or a small positive value.

Figure 2:
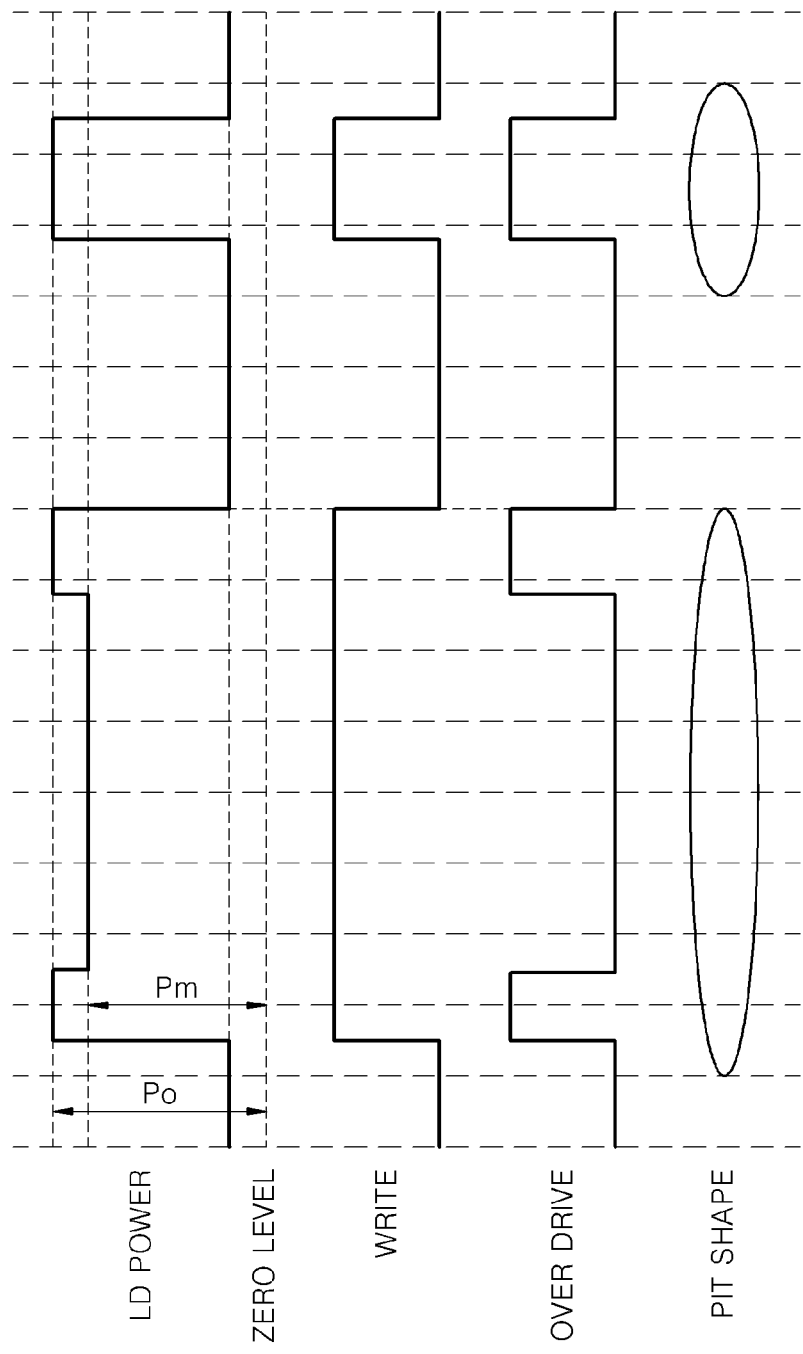
FIG. 2 is a diagram illustrating an example of a write pulse pattern and an over drive pattern that correspond to a pit shape, and a pattern of laser diode (LD) power that is formed by adding write power and over drive power, with respect to an LD.

FIG. 2 illustrates an example of a write pulse pattern and an over drive pattern that correspond to a pit shape, and a pattern of laser diode (LD) power that is formed by adding write power and over drive power, with respect to an LD. Referring to FIG. 2, the LD power has a pulse waveform with a shape that is formed by adding write (pulse) power Pm and over drive (pulse) power Po.

In various aspects herein, in order to improve a long-term storability of information optically written on the optical disc, the range of a ratio of the over drive (pulse) power Po with respect to the write (pulse) power Pm may be as represented by the following Equation 2:

$$1.1 \leq (Pm+Po)/Pm \leq 1.5 \quad (2)$$

The write (pulse) power Pm and the over drive (pulse) power Po are generated by generating first and second signals and by synthesizing the first and second signals. For example, a first signal including a write pulse at a preset level Pm may be generated in response to information to be written. A second signal including an over drive pulse that is synchronized with the write pulse and which is at a higher level Po than the preset level Pm may be generated. Information may be written to an optical disc using a driving signal that is obtained by synthesizing the first and second signals. The level Pm of the write pulse and the level Po of the over drive pulse may satisfy the condition of Equation 2 above.

Figure 3:
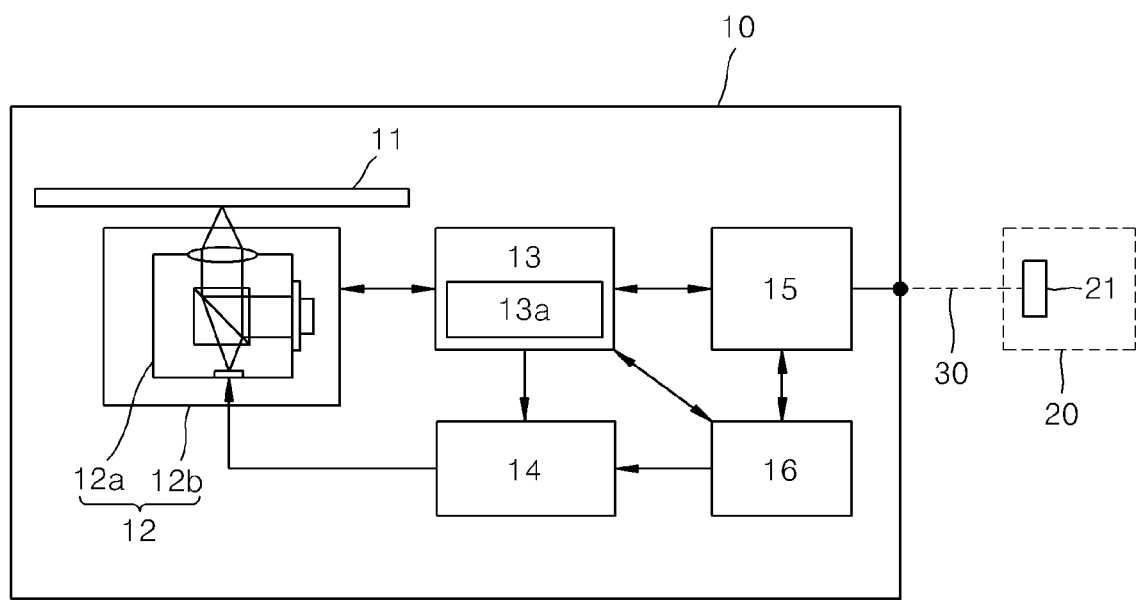
FIG. 3 is a diagram illustrating an example of an optical disc drive.

FIG. 3 illustrates an example of an optical disc drive 10.

Referring to FIG. 3, the optical disc drive 10 includes an optical pickup 12 that may read information from an optical medium 11 and/or may write information to the optical medium 11. The optical pickup 12 includes an optical system 12a which may include an objective lens, an LD, a photodetector, and the like. The optical pickup 12 also includes a mechanical system 12b that supports the optical system 12a and induces focusing and tracking operations. A radio frequency (RF) information processing unit 13 processes an RF signal from the optical pickup 12. The RF information processing unit may include an encoder/decoder (not shown) and a detector 13a that detects a β value from the RF signal. In this example, the RF information processing unit 13 is connected to an interface 15 connected to an external host. The detector 13a is connected to a LD driver 14 and transmits the β value. The LD driver 14 includes a scanning optical power calibrator (SOPC) (not shown) that calibrates power of the LD. The RF information processing unit 13, the LD driver 14, and the interface 15 are controlled by a central processing unit (CPU) 16 including a microprocessor.

According to various aspects, the LD driver 14 may generate the first and second signals described above and the signal that is obtained by synthesizing the first and second signals. The level Pm of the write pulse and the level Po of the over drive pulse included in the first and second signals may satisfy the condition of Equation 2 above.

ODD products that are sold for long-term storage have relatively high optical power (β>0 or β=0) because, as known, the write quality and reproduction characteristics of the ODD products are improved using high optical power. However, various aspects herein describe a write technology for realizing a β of zero or a β value that is a positive number that is close to 0 in consideration of write quality in order to store information written onto an optical disc for a longer time while not deteriorating the optical disc. For example, β, which is an optical write index, may be set to be less than 7%.

However, even when β is set to be a small, positive number in order to improve write quality, the β value varies based on vibration that occurs when the optical disc is rotated and based on a change in thicknesses of reflective layers. When the β value varies, jitter increases, which results in an increase in a burst error, a block error, and an error rate PI/PO or C1/C2 and promotes deterioration when the information written onto the optical disc is stored for a long time. The various aspects herein describe an optimum write technology for long-term storage.

A predetermined small, optimum β value may not be implemented in the optical disc at a maximum speed. Thus, a write technology for long-term storage may not be implemented at a maximum speed.

According to various aspects, the optical disc drive 10 may be accessed at a constant linear velocity (CLV) or a zone-constant linear velocity (Z-CLV). In this example, β may be controlled by the SOPC that uses feedback control.

In an optical disc, when a write layer and a reflective layer are adjacent to each other and a beam spot is condensed on the write layer, thermal transfer characteristics transferred to the reflective layer due to a thermal interaction with the reflective layer may not be uniform from an inner region to an outer region of the optical disc. Accordingly, a write quality is unbalanced. Thus, in order to stably maintain write quality it is desirable for the write layer and the reflective layer to have a uniform thickness.

Figure 4:
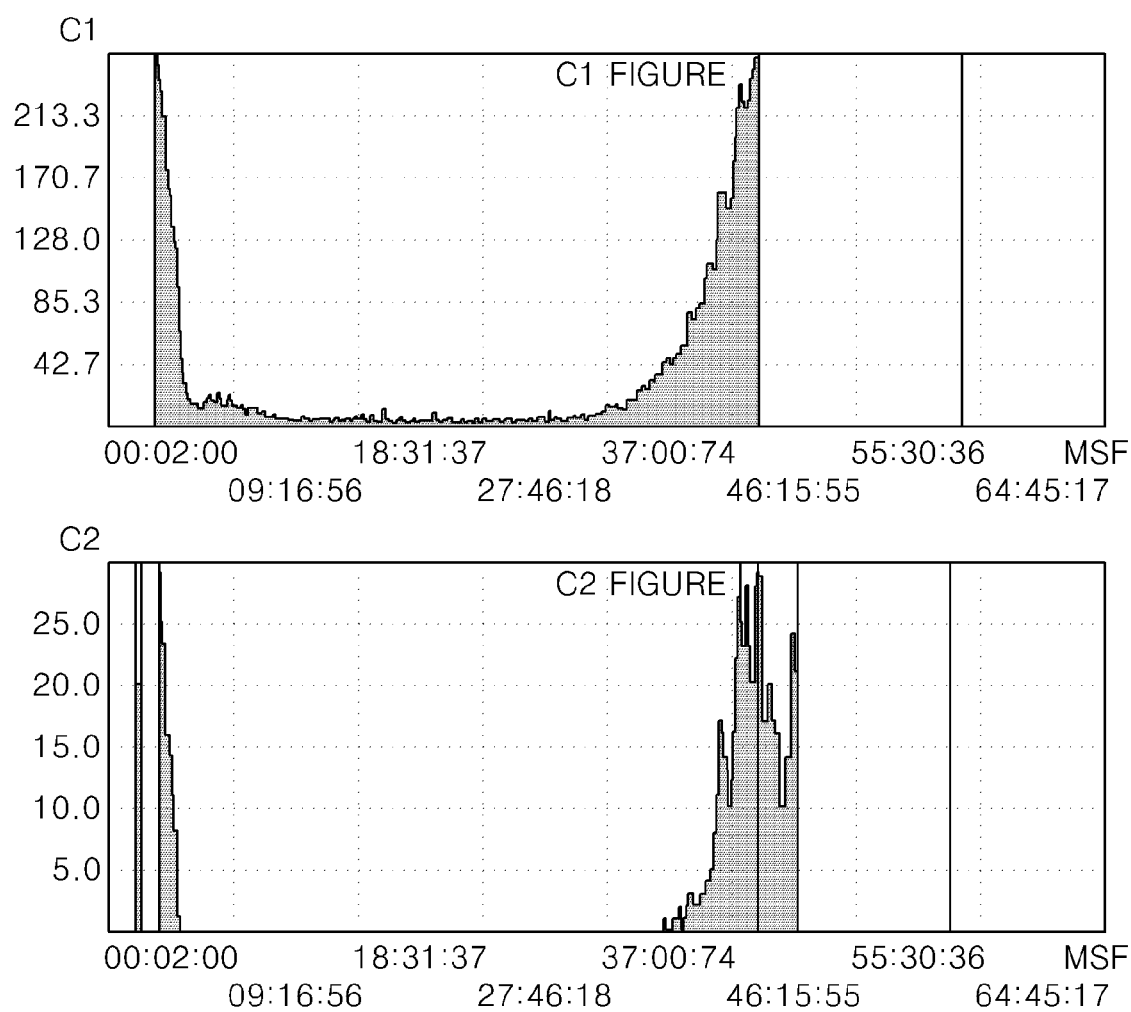
FIG. 4 is a diagram illustrating an example of graphs which show a result of measuring patterns of error rates when information written to an optical disc is stored over a period of time.

FIG. 4 illustrates examples of graphs which show a result of measuring patterns of error rates C1 and C2 when information written to an optical disc is stored for a long period of time. The left side of FIG. 4 indicates an inner region of the optical disc, and the right side of FIG. 4 indicates an outer region of the optical disc. Reflective layers that each have a uniform thickness and a relatively large area are disposed in an intermediate region of the optical disc, and reflective layers that have a relatively smaller thickness are disposed in the inner and outer regions of the optical disc.

When an error of 1 byte or more exists in a row of an error correction code (ECC) block, the error is referred to as a 1 PI error. The following Tables 1 and 2 show a result of measuring PI errors.

TABLE 1

| Classification | 0 hr | 500 hr | 1000 hr | 1500 hr | 2000 hr | % | Result |
|---|---|---|---|---|---|---|---|
| #1 | 20.2 | 13.3 | 46.5 | 80.4 | 85.4 | 423% | NG |
| #2 | 18.5 | 10.7 | 109.7 | 127.4 | 130.3 | 704% | NG |
| #3 | 30.5 | 51.1 | 198.2 | 206.9 | 216.4 | 710% | NG |
| #4 | 24.7 | 31.3 | 131.4 | 171.8 | 178 | 721% | NG |
| #5 | 12.4 | 8.4 | 9.6 | 26.9 | 47.3 | 381% | GD |
| #6 | 26 | 23.1 | 19.8 | 26.8 | 51.7 | 199% | GD |
| #7 | 27.9 | 23.1 | 32.2 | 43.8 | 66.3 | 238% | GD |
| #8 | 18.8 | 20 | 193.3 | 246.1 | 244.2 | 1299% | NG |

TABLE 2

| Classification | 0 hr | 500 hr | 1000 hr | 1500 hr | 2000 hr | % | Result |
|---|---|---|---|---|---|---|---|
| #1 | 23.2 | 8.9 | 11.6 | 30.2 | 60.1 | 259% | NG |
| #2 | 18.7 | 11.6 | 21.4 | 51.4 | 88.7 | 474% | NG |
| #3 | 31 | 66.2 | 61.6 | 113 | 175.3 | 565% | NG |
| #4 | 23.3 | 10.2 | 34.2 | 69.9 | 101.5 | 436% | NG |
| #5 | 14.6 | 7.9 | 10.8 | 15.7 | 21.1 | 145% | GD |
| #6 | 24.7 | 37.5 | 24.5 | 23.4 | 34.1 | 138% | GD |
| #7 | 21.6 | 60.8 | 40.2 | 32 | 38 | 176% | GD |
| #8 | 17.7 | 9.5 | 32.2 | 53.4 | 71.3 | 403% | NG |

Tables 1 and 2 show results of measuring PI errors performed under a condition of $\beta=3\%$ and humidity of 85% and 70%, respectively, at 85° C.

According to the above results, the results of #5, #6, and #7 are good, and the other results are not as good. The results of #5, #6, and #7 show a ratio of 1.3, and the other results show the ratio of 1.1 or less and 1.5 or more, which are suitable for long-term storage.

Based on the experimental results, good results are obtained under a condition of $\beta=7\%$ or less and $1.1 \leq (Pm+Po)/Pm \leq 1.5$. When information is written onto the optical disc, a scanning operation is more finely performed in an SOPC address (for example, a change from 10000h to 8000h). Furthermore, in order to prevent an increase in a $\beta$ value in an outer region of the optical disc, an end address may be changed from 230000h to 255000h. In this state, when a $\beta$ measurement error is set to be less than 5%, a constant $\beta$ value may be written from the inner region to the outer region of the optical disc.

Figure 5:
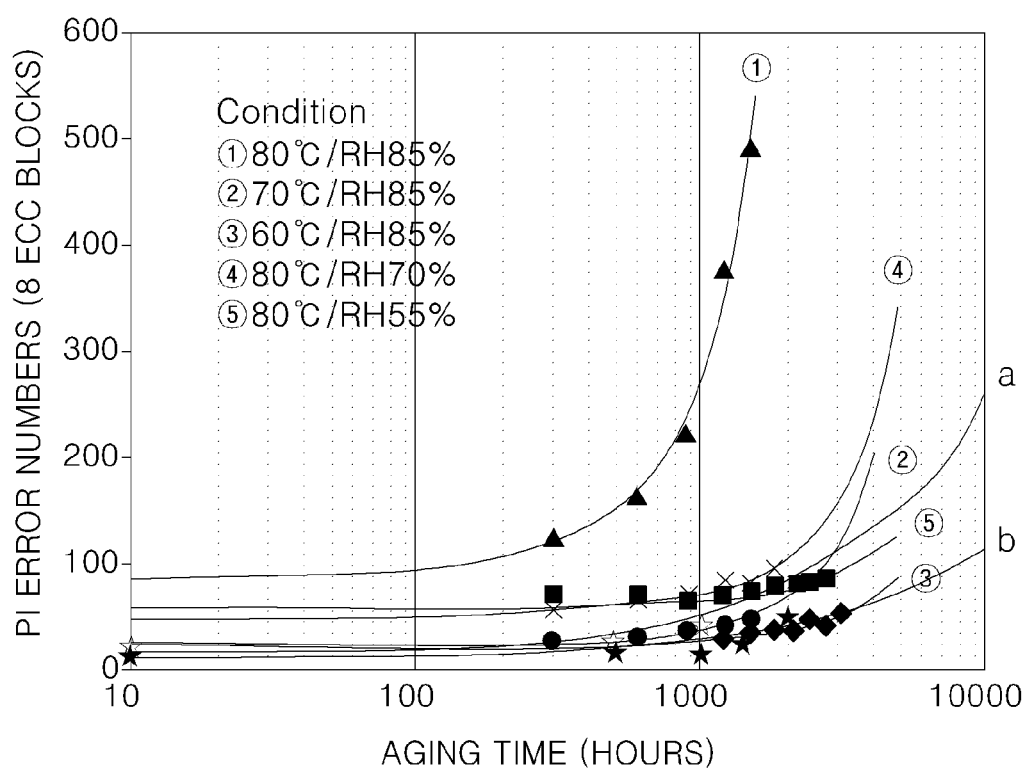
FIG. 5 is a diagram illustrating an example of a graph which shows PI error numbers versus an aging time.

According to various aspects, by integrating the results obtained by conducting various experiments, a very excellent long-term storability under a condition of $(Pm+Po)/Pm=1.3$ and $\beta=3$ is confirmed. FIG. 5 is a graph showing PI error numbers versus an aging time. In FIG. 5, reference characters a and b indicate results of aging acceleration experiments conducted when a write technology according to the present invention is applied under a condition of humidity of 85% and 70%, at temperatures ranging from 60° C. to 80° C. As a result of obtaining an expected life span of a general DVD-R disc under a condition of 25° C./RH 50%, 758000 hours = 86.6 years with an accuracy of 95% has been calculated.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical recording method comprising:
   generating a first signal comprising a preset write pulse power Pm, in response to information to be written;
   generating a second signal comprising an over drive pulse power Po that is synchronized with the preset write pulse power Pm; and
   writing the information on an optical disc using a driving signal that is obtained by synthesizing the first and second signals,
   wherein the preset write pulse power Pm and the over drive pulse power Po satisfy the following equation $$1.1 \leq (Pm+Po)/Pm \leq 1.5.$$

2. The optical recording method of claim 1, wherein an optical write index $\beta$ is defined by a positive pulse level A1 and a negative pulse level A2 of the preset write pulse power Pm, according to the following equation:
   $\beta=A1-A2/(A1+A2)$, where $\beta$ is set to be less than 7%.

3. The optical recording method of claim 1, wherein information is written to the optical disc at a constant linear velocity (CLV).

4. The optical recording method of claim 1, wherein information is written to the optical disc at a zone constant linear velocity (Z-CLV).

5. The optical recording method of claim 3, wherein the preset write pulse power Pm and the over drive pulse power Po satisfy the following equations in which $(Pm+Po)/Pm=1.3$, and $\beta=3$.

6. The optical recording method of claim 4, wherein the preset write pulse power Pm and the over drive pulse power Po satisfy the following equations in which $(Pm+Po)/Pm=1.3$, and $\beta=3$.

7. The optical recording method of claim 1, wherein the preset write pulse power Pm and the over drive pulse power Po satisfy the following equations in which $(Pm+Po)/Pm=1.3$, and $\beta=3$.

8. The optical recording method of claim 1, wherein the over drive pulse power Po is at a higher level than the preset write pulse power Pm.

9. An optical disc drive comprising:
   an optical pickup configured to write information to an optical disc; and
   a driving circuit configured to generate a driving signal for writing the information to the optical disc,
   wherein the driving circuit generates a first signal comprising a preset write pulse power Pm, in response to the information to be written, generates a second signal comprising an over drive pulse power Po that is synchronized with the preset write pulse power Pm, and outputs a high frequency driving signal that is obtained by synthesizing the first and second signals to the optical pickup, and
   the preset write pulse power Pm and the over drive pulse power Po satisfy the following equation $$1.1 \leq (Pm+Po)/Pm \leq 1.5.$$

10. The optical disc drive of claim 9, wherein an optical write index $\beta$ is defined by a positive pulse level A1 and a negative pulse level A2 of the preset write pulse power Pm, according to the following equation:

$\beta A1-A2/(A1+A2)$, where $\beta$ is set to be less than 7%.

11. The optical disc drive of claim 9, wherein information is written to the optical disc at a constant linear velocity (CLV).

12. The optical disc drive of claim 9, wherein information is written to the optical disc at a zone constant linear velocity (Z-CLV).

13. The optical disc drive of claim 11, wherein the preset write pulse power Pm and the over drive pulse power Po satisfy the following equations in which (Pm +Po)/Pm=1.3, and $\beta$=3.

14. The optical disc drive of claim 12, wherein the preset write pulse power Pm and the over drive pulse power Po satisfy the following equations in which (Pm +Po)/Pm=1.3, and $\beta$=3.

15. The optical disc drive of claim 10, wherein the preset write pulse power Pm and the over drive pulse power Po satisfy the following equations in which (Pm +Po)/Pm=1.3, and $\beta$=3.

16. The optical disc drive of claim 9, wherein the over drive pulse power Po is at a higher level than the preset write pulse power Pm.

17. The optical recording method of claim 2, further comprising: configuring an absolute value of A1 to be substantially equal to an absolute value of A2.

18. The optical recording method of claim 2, further comprising: configuring an absolute value of A1 to be greater than an absolute value of A2.

19. The optical disc drive of claim 10, wherein an absolute value of A1 is substantially equal to an absolute value of A2.

20. The optical disc drive of claim 10, wherein an absolute value of A1 is greater than an absolute value of A2.

\* \* \* \* \*